INVENTOR.
C. E. JONES
BY Young & Quigg
ATTORNEYS

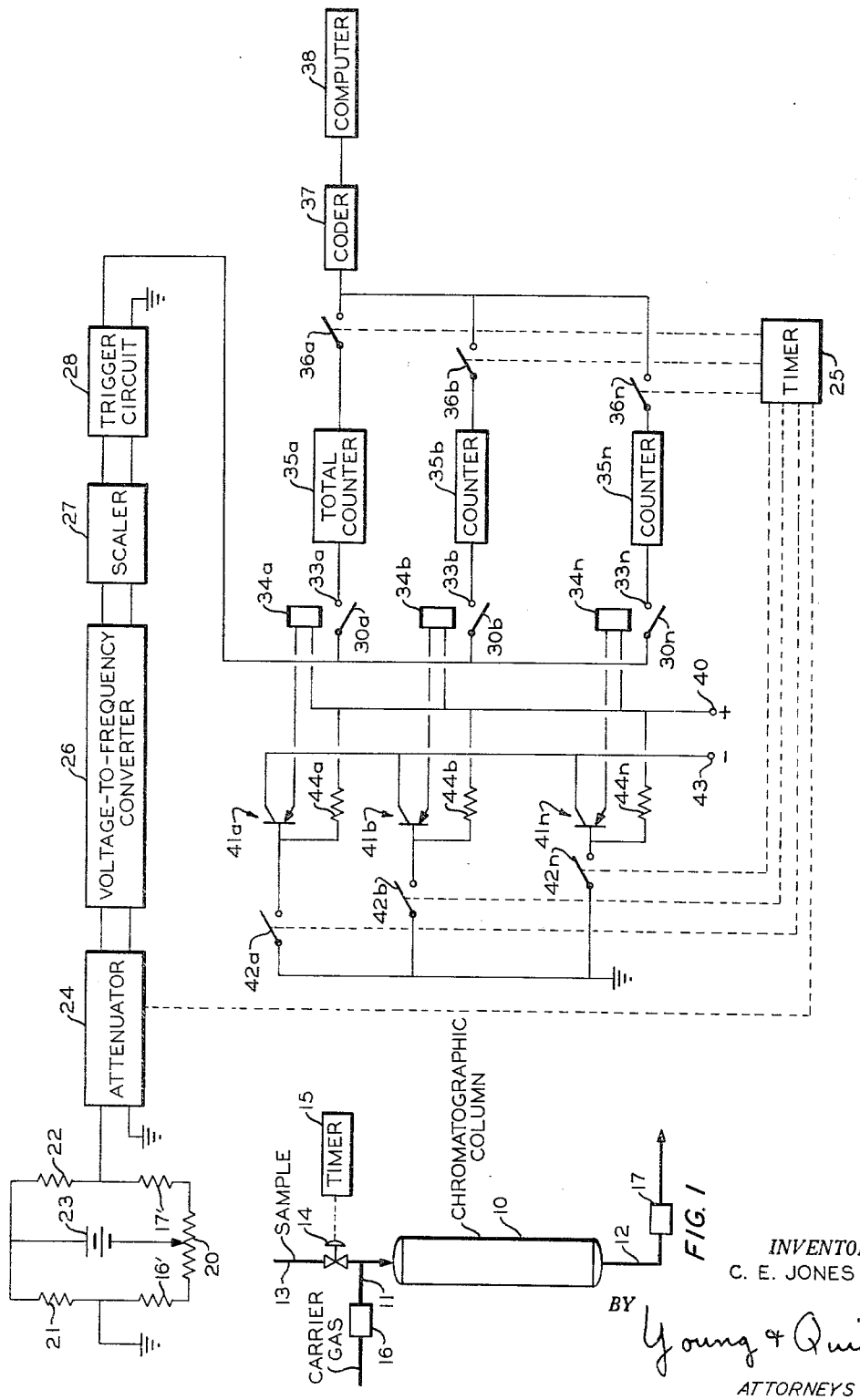

Nov. 23, 1965    C. E. JONES    3,219,803
ELECTRICAL MEASURING APPARATUS
Filed Jan. 8, 1962    3 Sheets-Sheet 3

INVENTOR.
C. E. JONES
BY Young & Quigg
ATTORNEYS

United States Patent Office 3,219,803
Patented Nov. 23, 1965

3,219,803
ELECTRICAL MEASURING APPARATUS
Charles E. Jones, Bartlesville, Okla., assignor to Phillips Petroleum Company, a corporation of Delaware
Filed Jan. 8, 1962, Ser. No. 164,842
4 Claims. (Cl. 235—92)

This invention relates to measuring and recording a plurality of signals which are received in sequence.

Several types of analytical instruments are known which provide a plurality of output signals in sequence that are representative of the individual components of a material being analyzed. One such analyzer utilizes the principles of cromatography. A sample of a fluid mixture to be analyzed is introduced into a column which contains material that selectively retards passage therethrough of the individual components of the sample. A carrier gas is then directed through the column to elute the individual constituents in sequence. These constituents normally are detected by means of a thermal conductivity cell which measures the heat conductivity of the effluent gas from the column. The detector cell usually comprises a temperature sensitive resistance element which is connected in a bridge network so that an output voltage signal is established. Another type of analyzer which provides a plurality of output signals in sequence is a mass spectrometer. By varying either a magnetic field which deflects the charged particles or a potential which accelerates the charged particles toward the collector, the associated detector responds in sequence to charged particles having different masses. The detector circuit normally provides an output voltage representative of the rate of impingement of charged particles on the collector.

Heretofore, it has been the general practice to measure or record directly the analog voltages established by the detecting circuits of such analyzers. However, these recorded voltages can not always be identified or interpreted readily by an operator in an industrial plant. In addition, it is often difficult for an operator to calculate the concentration of individual components of a sample mixture from the recorded voltages.

In accordance with the present invention, a system is provided for converting a plurality of voltage signals which are received in sequence into corresponding fluctuating signals, the frequencies of which are proportional to the amplitudes of the corresponding voltage signals. The total number of pulses of each individual signal 's counted to provide an output signal representative of the corresponding input voltage signal. In addition, the total number of pulses received during the complete analysis is counted and a signal representative thereof is established. The final output signals representative of the individual signals are then divided by the total signal to determine the ratios of the individual signals to the total signal. When the input signals represent the concentrations of constituents of a fluid mixture, the output ratio signals are indicative of the percentages of these individual components in the fluid mixture.

Accordingly, it is an object of this invention to provide a method of and apparatus for measuring and recording a plurality of signals which are received in sequence.

Another object is to provide apparatus for measuring the percentages of components of fluid mixtures.

A further object is to provide improved recording apparatus for use with analytical instruments.

Other objects, advantages and features of the invention should become apparent from the following detailed description, taken in conjunction with the accompanying drawing in which:

FIGURE 1 is a schematic representation of a chromatographic analyzer which is adapted to provide output signals of the type to be measured by the procedure of this invention.

FIGURE 2 is a schematic circuit drawing of the measuring apparatus of this invention.

Figure 3:
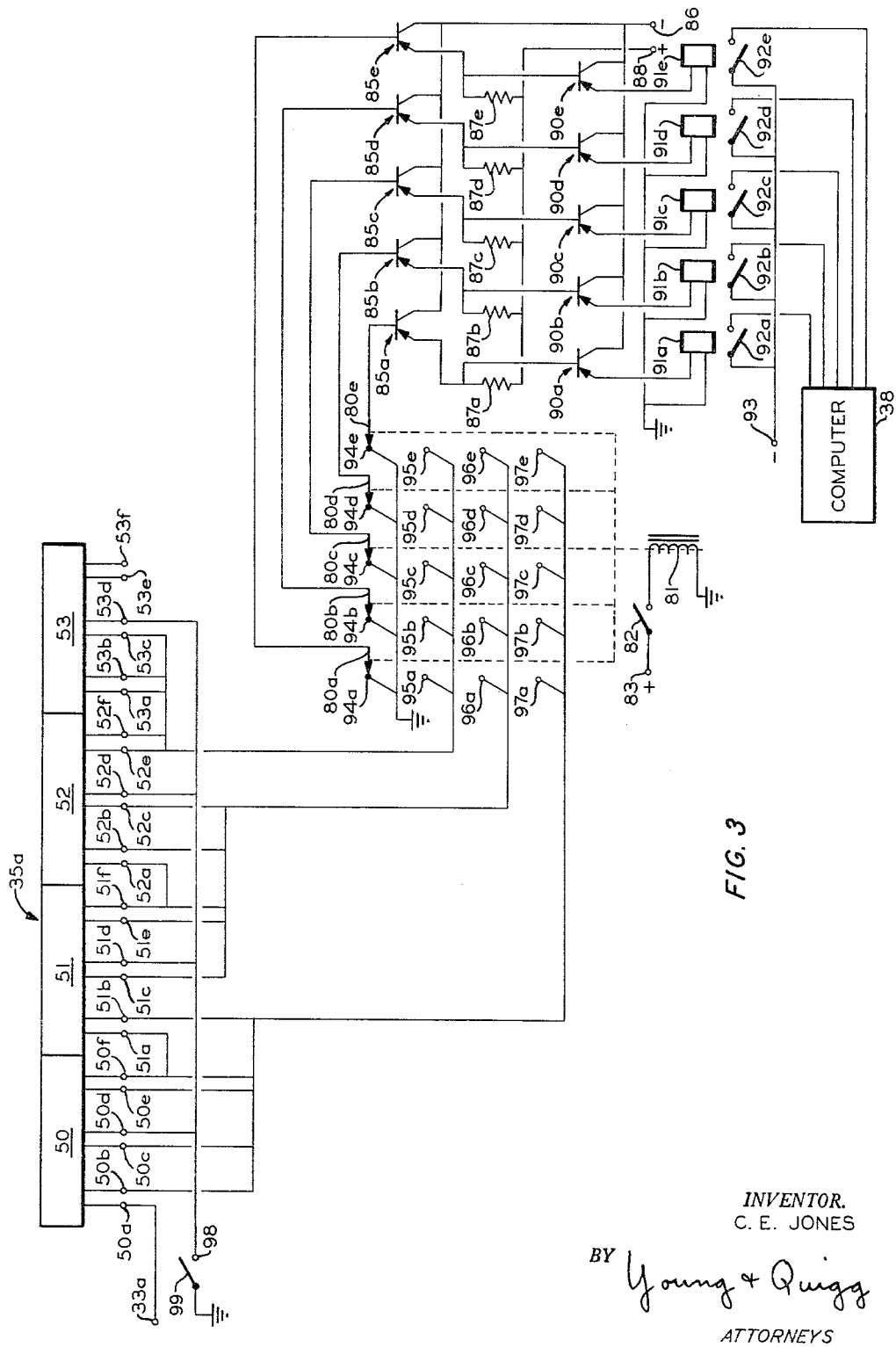
FIGURE 3 is a schematic circuit drawing of one of the counters and the coder employed in the apparatus of FIGURE 2.

Referring now to the drawing in detail and to FIGURE 1 in particular, there is shown a conventional chromatographic column 10 which is filled with a packing material that selectively retards passage therethrough of constituents of a fluid mixture to be analyzed. A carrier gas is introduced into the first end of column 10 through a conduit 11. A conduit 12 removes the effluent from column 10. A sample conduit 13, having a control valve 14 therein, communicates with the first end of column 10. Valve 14 is opened periodically for a preselected time interval by means of a timer 15 so as to introduce a predetermined volume of fluid sample to be measured into column 10. Although shown schematically, valve 14 can be any type of sample valve known in the art which permits the introduction of a predetermined volume of fluid sample.

First and second sensing elements 16 and 17 are disposed to respective conduits 11 and 12. These elements are adapted to compare a property of the fluid flowing through the two conduits to provide an indication of differences therebetween. These detecting elements are advantageously temperature sensitive resistance elements 16' and 17', as shown in FIGURE 2. The detecting elements are connected into a measuring circuit 18 which is described hereinafter in detail. Before the sample fluid is introduced into column 10, carrier gas flows through conduits 11 and 12 so that elements 16 and 17 respond to the same fluid and have identical outputs. Valve 14 is then opened to introduce a sample into column 10. The carrier gas elutes the constituents of the sample from the column in sequence so that element 17 responds sequentially to these individual constituents.

The resistances of temperature sensitive elements 16' and 17' are compared by means of a bridge network which is illustrated in FIGURE 2. First terminals of elements 16' and 17' are connected to the respective end terminals of a potentiometer 20. Resistance elements 21 and 22 are connected in series between the second terminals of elements 16' and 17'. A voltage source 23 is connected between the contactor of potentiometer 20 and the junction between elements 21 and 22. The junction between elements 16' and 21 is connected to ground. The junction between elements 17' and 22 is connected to the first input terminal of an attenuator circuit 24, the second input terminal of which is connected to ground.

When carrier gas alone is flowing through conduits 11 and 12, the bridge is balanced by adjusting the contactor of potentiometer 20 until the potential at the junction between elements 17' and 22 is zero. The presence of sample constituents in effluent conduit 12 changes the thermal conductivity of the gas flowing through this conduit so as to change the resistance of temperature sensitive resistance element 17'. This unbalances the bridge network so that a potential appears at the output terminal between elements 17' and 22.

Attenuator network 24 is controlled by means of a timer 25 such that the bridge unbalance signals representative of the individual components can be adjusted in magnitude to compensate for different thermal conductivities of these individual components. This network can comprise a plurality of voltage dividing networks which selectively reduce the amplitudes of the output signals from the bridge network. Timer 25 selectively connects these bridge output signals to the proper voltage dividing network. In this manner, the output signals from the attenuator can be adjusted so as to be of approximately the same magnitude. Of course, this introduces a scaling factor which must be considered in interpreting the final output signals. The attenuator circuit can also be provided with an amplifier, if desired, to increase the output signals to a suitable amplitude.

The output signals from attenuator 24 are applied to the input of a voltage-to-frequency converter 26 which provides output alternating signals, the frequencies of which are directly proportional to the magnitudes of the input voltage. A suitable converter for this purpose is the DY–2210 Converter, manufactured by Dymec Inc., Palo Alto, California, and which is described in Control Engineering, March 1959, page 144. The output signal from converter 26 is applied through a scaler 27 to the input of a trigger circuit 28. Scaler circuit 27 can be employed to reduce the frequency of the output signal from converter 26 by a preselected fraction, if desired. Trigger circuit 28 can be a conventional Schmitt trigger circuit to provide sharp output pulses to actuate the counters described hereinafter. The first output terminal of trigger circuit 28 is connected to a plurality of switches 30a, 30b, . . . 30n. The second output terminal of trigger circuit 28 is connected to ground.

Switches 30a, 30b, . . . 30n engage respective terminals 33a, 33b, . . . 33n when respective relay coils 34a, 34b, . . . 34n are energized. Terminals 33a, 33b, . . . 33n are connected to the inputs of respective counters 35a, 35b, . . . 35n. The outputs of these counters are connected through respective switches 36a, 36b, . . . 36n to the input of a coder 37. The output of coder 37 is applied to the input of a computer 38. Relay coils 34a, 34b, . . . 34n are energized when respective switches 42a, 42b, . . . 42n are closed by timer 25. Closure of these switches connects the bases of respective transistors 41a, 41b, . . . 41n to ground. The emitters of these transistors are connected through the associated relay coils to a terminal 40 that is maintained at a positive potential. The collectors of the transistors are connected to a terminal 43 that is maintained at a negative potential. Resistors 44a, 44b, . . . 44n are connected between the bases of the respective transistors and terminal 40.

Switch 42a is closed during the entire analysis such that counter 35a receives the total number of output pulses from converter 26. Switches 42b . . . 42n are closed in sequence during the analysis such that signals representative of the individual peaks of the bridge output are applied to respective counters 35b . . . 35 n. At the end of the analysis cycle, switches 36a, 36b, . . . 36n are closed in sequence by timer 25 such that the output signals from the counters are applied in sequence through coder 37 to computer 38. The computer divides the signals received from counters 35b . . . 35 n by the signal from counter 35a to determine the ratios of the individual counts to the total count.

Counter 35a is illustrated schematically in FIGURE 3. This counter comprises four identical sections 50, 51, 52 and 53. Each of the counter sections is provided with seven terminals. The terminals associated with counter section 50 are designated 50a, 50b, . . . 50f.

Figure 4:
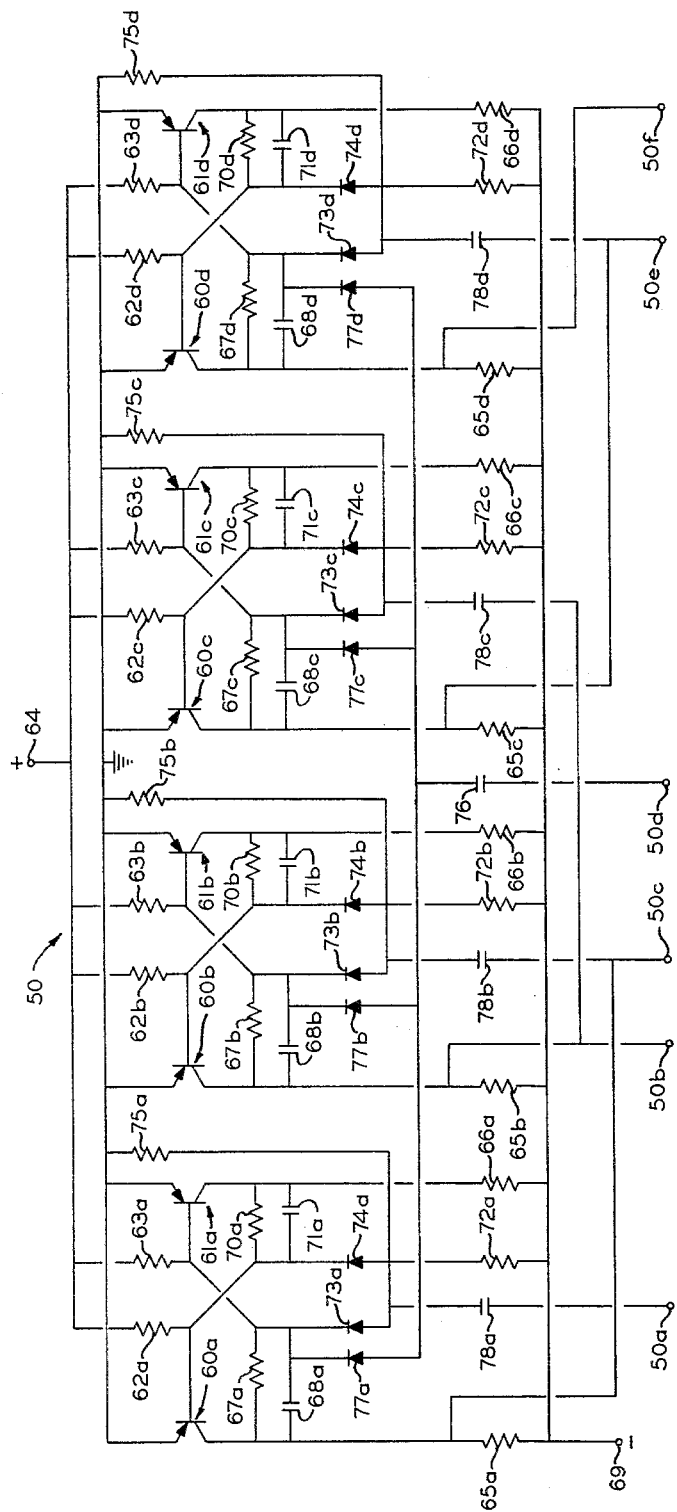
FIGURE 4 is a schematic circuit drawing of a section of a counter employed in the apparatus of FIGURE 3.

Counter section 50 is illustrated in detail in FIGURE 4. The bases of first and second transistors 60a and 61a are connected through respective resistors 62a and 63a to a terminal 64 that is maintained at a positive potential. The emitters of these transistors are connected to ground. The collectors of transistors 60a and 61a are connected through respective resistors 65a and 66a to a terminal 69 that is maintained at a negative potential. The collector of transistor 60a is connected by means of a resistor 67a to the base of transistor 61a. A capacitor 68a is connected in parallel with resistor 67a. The collector of transistor 61a is connected by means of a resistor 70a to the base of transistor 60a. A capacitor 71a is connected in parallel with resistor 70a. A resistor 72a and a rectifier 73a are connected between terminal 69 and the base of transistor 61a. A rectifier 74a is connected between resistor 72a and the base of transistor 60a. A capacitor 76 and a rectifier 77a are connected between terminal 50d and the base of transistor 61a.

Counter 50 contains three other sections which are identical to the one thus far described and wherein corresponding elements are designated by similar reference numerals. Input terminal 50a is connected by means of a capacitor 78a to rectifiers 73a and 74a. The collector of transistor 60a is connected directly to output terminal 50c and through capacitor 78b to rectifiers 73b and 74b. The collector of transistor 60b is connected directly to output terminal 50b and through capacitor 78c to rectifiers 73c and 74c. The collector of transistor 60c is connected directly to output terminal 50e and through capacitor 78d to rectifiers 73d and 74d. The collector of transistor 60d is connected directly to output terminal 50f. The flip-flop circuits of the counter are thus actuated in sequence by an input signal being applied to terminal 50a.

As previously mentioned, the output signals from the counters are transmitted in sequence to computer 38. The apparatus employed to perform this transfer operation is illustrated in FIGURE 3. A plurality of stepping switches 80a, 80b, 80c, 80d and 80e are actuated by means of a coil 81 which is energized by closure of a switch 82 to apply a potential from terminal 83 to the coil. Switch 82 is actuated periodically by timer 25. Switches 80a, 80b, 80c, 80d and 80e are connected to the bases of respective transistors 85e, 85d, 85c, 85b and 85a. The collectors of these transistors are connected to a terminal 86 that is maintained at a negative potential. The emitters of transistors 85a to 85e are connected by means of respective resistors 87a to 87e to a terminal 88 that is maintained at a positive potential. The emitters of transistors 85a to 85e are also connected to the bases of respective transistors 90a to 90e. The collectors of this latter group of transistors are connected to terminal 86. The emitters of transistors 90a to 90e are connected to ground through respective relay coils 91a to 91e. A negative potential terminal 93 is connected to the input terminals of computer 38 through switches 92a to 92e when these switches are closed by respective relay coils 91a to 91e being energized.

Switches 80a to 80e initially engage respective terminals 94a to 94e which are connected to ground. At this time, relay coils 91a to 91e remain deenergized so that no signals are transmitted to computer 38. At the beginning of the readout period of the analysis, coil 81 is energized by closure of switch 82 to move switches 80a to 80e into engagement with respective terminals 95a to 95e. These terminals are connected to one another and to terminals 52e, 52f, 53a, 53b and 53c of counter 35a. Thereafter, switch 82 is again closed to move switches 80a to 80e into engagement with terminals 96a to 96e. These terminals are connected to one another and to terminals 51c, 51e, 51f, 52b and 52c of counter 35a. When switch 82 is once again closed, switches 80a to 80e move into engagement with terminals 97a to 97e. These terminals are connected to one another and to terminals 50b, 50c, 50e, 50f and 51b of switch 35a. The remaining counters 35b to 35n are identical to counter 35a and switches 80a to 80e engage the associated output terminals thereof in sequence.

The terminals of the individual sections of the counters are connected to one another and to the output terminals so as to provide a coded output representative of the readings on the counters. The output terminals which are at a potential other than ground serve to energize the associated relay coils 91a to 91e through the transistor circuits connected to the output terminals of the counters. In this manner, either negative or zero potentials are applied to the input terminals of computer 38 at each position of the stepping switch, depending upon which of the relay coils 91a to 91e are energized. It should be observed that there are a total of fifteen input signals applied to the computer from each of the counters. The particular coding arrangment illustrated results in a unique signal being transmitted to the computer which represents the signal on the counter. After all of the signals from the counters are transmitted to computer 38, the computer is operated, as by timer 25, to divide the signals from the individual counters by the signal from the total counter. It should be evident that computer 38 can be any type of digital computer known in the art. As previously mentioned, some of the output bridge signals may be reduced in amplitude by attenuator 24. This must be considered in reading the computer output. As an alternative, the computer can be calibrated to eliminate the effect of the attenuator.

At the end of the analysis cycle, timer 25 moves switch 99 of FIGURE 3 into engagement with terminal 98. This applies a ground potential to terminals 50d, 51d, 52d and 53d of counter 35a to reset the same. The other counters 35b . . . 35n are reset in the same manner. This prepares the apparatus for the next analysis.

The recording and computing apparatus of this invention has been described in conjunction with a chromatographic analyzer. However, it is not limited thereto. For example, the accelerating potentials or the magnetic field of a mass spectrometer can be varied so that a series of output signals are provided which represent individual ions of the mixture being analyzed. These output signals can be supplied to the input of attenuator 24.

While the invention has been described in conjunction with a presently preferred embodiment, it should be evident that it is not limited thereto.

What is claimed is:

1. Analysis apparatus comprising an analyzer adapted to provide a plurality of output voltages in sequence, each representative of a component of the material being analyzed; converter means to provide a fluctuating output signal for each of said output voltages applied thereto, each fluctuating output signal comprising a series of pulses having a frequency which is proportional to the amplitude of the respective one of said output voltages; means to apply the output voltages from said analyzer to the input of said converter means; a plurality of digital pulse signals counting means; means to apply all of the output signals from said converter means to the first of said counting means to register a value representative of the number of pulses in the total output of said converter means; means to apply individual output signals from said converter means to respective ones of the remainder of said counting means in sequence to register on each of said remainder of said counting means a value representative of the number of pulses in the respective output signal applied thereto; and means to divide the value registered on each of said remainder counting means by the value registered on said first counting means.

2. Analysis apparatus comprising an analyzer adapted to provide a plurality of output voltages in sequence, each representative of a component of the material being analyzed; converter means to provide a fluctuating output signal for each of said output voltages applied thereto, each fluctuating output signal comprising a series of pulses having a frequency which is proportional to the amplitude of the respective one of said output voltages; means to apply the output voltages from said analyzer to the input of said converter means; a plurality of digital pulse signals counting means; means to apply all of the output signals from said converter means to the first of said counting means to register a value representative of the number of pulses in the total output of said converter means; means to apply individual output signals from said converter means to respective ones of the remainder of said counting means in sequence to register on each of said remainder of said counting means a value representative of the number of pulses in the respective output signal applied thereto; signal dividing means adapted to divide each of a plurality of first signals by a second signal; means to apply a plurality of first signals to said dividing means, each of said first signals being representative of the value registered on a respective one of said remainder of said counting means; and means to apply a second signal to said dividing means which is representative of the value registered on said first counting means.

3. The apparatus of claim 2 wherein said signal dividing means comprises a digital computer, and wherein said means to apply a plurality of first signals and said means to apply a second signal to said dividing means comprise coding means to transmit digital signals representative of the values registered on the respective counting means.

4. The apparatus of claim 2 wherein said analyzer is a chromatographic analyzer.

References Cited by the Examiner

UNITED STATES PATENTS

| 2,123,142 | 7/1938 | McMaster | 235—179 |
|---|---|---|---|
| 2,339,754 | 1/1944 | Brace | 88—14 |
| 2,446,874 | 8/1948 | Geffner et al. | 88—14 |
| 2,652,977 | 9/1953 | Levy | 235—179 |
| 2,835,868 | 5/1958 | Lindesmith | 324—111 |
| 3,005,911 | 10/1961 | Burhams | 235—151 |
| 3,147,370 | 9/1964 | Lowman | 235—151 |

FOREIGN PATENTS 745,817    3/1956    Great Britain.

OTHER REFERENCES

Pages 108–116, December 1962, Digital Control of In-Line Blending, by Hill, IRE Trans on Industrial Electronics.

MALCOLM A. MORRISON, *Primary Examiner.*